(12) United States Patent
Vetrovec

(10) Patent No.: US 7,302,795 B2
(45) Date of Patent: Dec. 4, 2007

(54) INTERNAL COMBUSTION ENGINE/WATER SOURCE SYSTEM

(76) Inventor: Jan Vetrovec, 8276 Eagle Rd., Larkspur, CO (US) 80118

( * ) Notice: Subject to any disclaimer, the term of this patent is extended or adjusted under 35 U.S.C. 154(b) by 0 days.

(21) Appl. No.: 11/178,517

(22) Filed: Jul. 11, 2005

(65) Prior Publication Data

US 2007/0006571 A1 Jan. 11, 2007

(51) Int. Cl.
*F01N 3/02* (2006.01)
(52) U.S. Cl. .................. 60/309; 60/274; 60/280; 60/320
(58) Field of Classification Search ............. 60/274, 60/280, 298, 309, 320
See application file for complete search history.

(56) References Cited

U.S. PATENT DOCUMENTS

| | | | |
|---|---|---|---|
| 2,077,315 A | | 4/1937 | Ewing et al. |
| 2,078,532 A | * | 4/1937 | Fischer .................. 244/61 |
| 2,310,767 A | * | 2/1943 | Ludwig .................. 244/95 |
| 2,479,766 A | * | 8/1949 | Mulvany ................ 244/1 R |
| 3,226,948 A | | 1/1966 | Alderson et al. |
| 4,656,831 A | * | 4/1987 | Budininkas et al. ......... 60/297 |
| 4,725,359 A | * | 2/1988 | Ray ....................... 210/640 |
| 4,813,632 A | * | 3/1989 | Woodhouse ................ 244/95 |
| 5,658,449 A | | 8/1997 | Benz et al. |
| 6,122,909 A | | 9/2000 | Murphy et al. |
| 6,230,503 B1 | | 5/2001 | Spletzer et al. |
| 6,360,549 B1 | | 3/2002 | Spletzer et al. |
| 6,427,639 B1 | | 8/2002 | Andrews et al. |
| 6,508,210 B2 | * | 1/2003 | Knowlton et al. ............ 123/3 |
| 6,511,525 B2 | | 1/2003 | Spletzer et al. |
| 6,581,375 B2 | | 6/2003 | Jagtoyen et al. |
| 6,659,049 B2 | | 12/2003 | Zagaja et al. |
| 6,698,389 B2 | | 3/2004 | Andrews et al. |
| 6,804,949 B2 | | 10/2004 | Anderws et al. |
| 6,810,657 B1 | | 11/2004 | Benninger et al. |
| 6,845,738 B2 | * | 1/2005 | Frutschi ................... 123/25 C |
| 6,857,397 B2 | | 2/2005 | Zagaja et al. |
| 6,863,711 B2 | | 3/2005 | Tongue et al. |
| 6,871,491 B2 | | 3/2005 | Breuer et al. |

* cited by examiner

*Primary Examiner*—Thomas Denion
*Assistant Examiner*—Diem Tran

(57) ABSTRACT

An internal combustion engine system for automotive vehicle wherein liquid water is produced by cooling a portion of exhaust gases at elevated pressure to induce condensation. The use of elevated pressure allows condensation to occur at a higher dew point which is easier to realize with cooling by ambient air. Liquid water condensate is collected and provided to an electrolytic cell for electrolysis into gaseous hydrogen and oxygen. Hydrogen gas generated by the cell is used by the internal combustion engine to reduce internal combustion engine wear and to reduce exhaust pollutants especially during start-up. Alternate uses of the liquid water include a replenishment of engine coolant and window washing fluid.

15 Claims, 4 Drawing Sheets

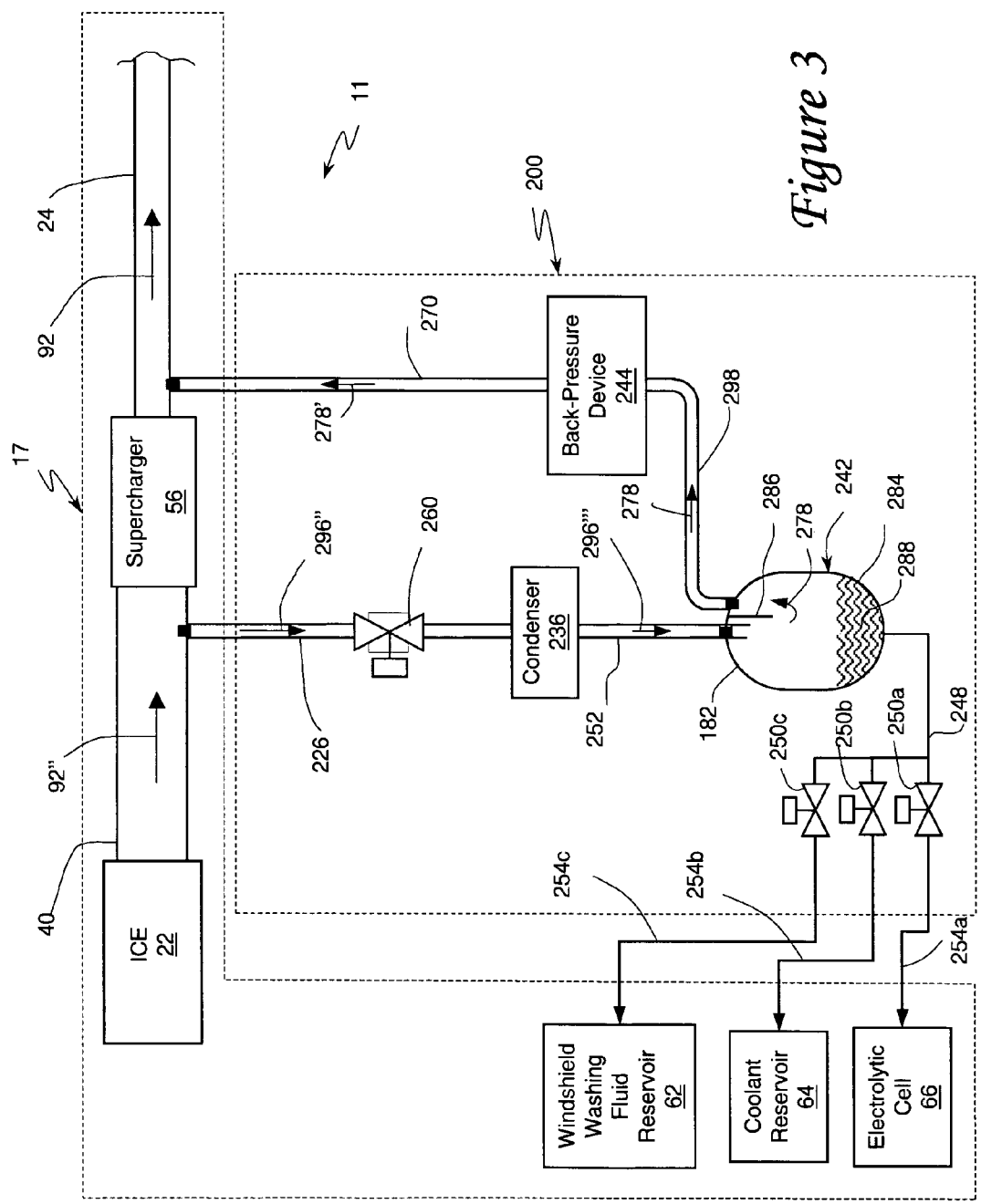

INTERNAL COMBUSTION ENGINE/WATER SOURCE SYSTEM

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The present invention relates to an apparatus and method for providing liquid water on-board an automotive vehicle. More particularly, the present invention relates to supplying water to an electrolytic cell for generation of hydrogen for improving the cold start-up of internal combustion engines.

BACKGROUND OF THE INVENTION

The primary motivation for producing water onboard an automotive vehicle is to use such water for electrolytic generation of hydrogen gas which, during a startup, can be fed into the intake of an automotive internal combustion engine (ICE) to reduce engine wear and/or into an engine exhaust system to reduce pollutants.

There are several problems that must be overcome during the start-up of a cold ICE. First, atomized or vaporous fuel in the air/fuel mixture introduced into the engine cylinders tends to condense onto the cold engine components, such as cylinder walls and the air intake rail. The potential for fuel condensation on cylinder walls is especially significant in compression ignition engines such as diesel engines. Condensed hydrocarbon fuels on engine cylinder walls may act as solvents that wash away desirable lubricant films resulting in excessive mechanical wear from reciprocating piston rings in sliding contact with the engine cylinder walls. The condensed mixture of fuel and lubricant is capable of passing the piston rings, entering the crankcase and contaminating the engine's lubrication reservoir resulting in a loss of overall lubricant effectiveness and a further increase in mechanical wear, even during normal operation. Second, the condensation of atomized or vaporous fuels onto cold engine cylinder walls results in poor engine performance and delayed engine availability during and immediately after cold engine start-up. ICE availability is diminished during cold engine start-up due to poor lubricant properties at low temperatures, non-uniform fuel distribution and improper air/fuel mixtures. Third, if the vehicle is equipped with a catalytic converter increased levels of unwanted pollutants are emitted from the tailpipe for a period of about one to three minutes after cold engine start-up because that is the amount of time normally needed for the ICE exhaust gases to heat the catalytic converter in the exhaust system to an efficient operating temperature.

The undesirable levels of pollutants released during and immediately after cold ICE start-up present a problem of increasing importance. In order to meet increasingly strict governmental engine emission standards, a catalytic converter is usually located in the exhaust stream of the engine. The conventional method of heating the catalytic converter to its efficient operating temperature is to heat the catalyst by passing high temperature exhaust gases from the ICE through the catalyst. This exhaust gas heating, in conjunction with the exothermic nature of the oxidation reactions occurring at the catalyst, will usually bring the catalyst to an efficient operating temperature, or "light-off" temperature, in one to three minutes. However, until the catalyst light-off temperature is reached, the ICE exhaust gasses pass through the catalytic converter relatively unchanged, and unacceptably high levels of pollutants such as carbon monoxide, hydrocarbons and nitrogen oxides are released into the atmosphere. According to some estimates, over 80% of the unacceptable emissions or pollutants are generated by ICE equipped with catalytic converter occur during cold start operations.

Prior art discloses several methods for overcoming these challenges. In one method gaseous hydrogen is added into the fuel mixture before combustion. In particular, Andrews et al. in U.S. Pat. No. 6,427,639 (Andrews 1) discloses a method for injecting gaseous hydrogen into ICE intake to preheat the intake gases and reduce engine wear. Murphy et al. in U.S. Pat. No. 6,122,909 discloses an apparatus for delivering hydrogen gas into ICE intake. When mixed and combusted with the hydrocarbon fuel, the gaseous hydrogen enhances the flame velocity and permits the engine to operate with leaner fuel mixtures. Thus, hydrogen has a catalytic effect causing a more complete burn of the existing fuel and yields a reduction in exhaust emissions. Apparatus disclosed by said Murphy can also inject hydrogen into ICE exhaust catalyst bed to condition NOx reducing catalyst and reduce emissions. Benninger et al. in U.S. Pat. No. 6,810,657 teaches an apparatus and a method for post treatment of ICE exhaust gases by addition of hydrogen to reduce pollutants. Breuer et al. in U.S. Pat. No. 6,871,491 discloses an emission control device using hydrogen gas to convert an automotive fluid into at least partially hydrogen-containing fuel.

Due to the advantages of using hydrogen for reducing ICE exhaust emissions and engine wear during cold startup, a number of attempts have been made to incorporate a hydrogen gas supply system with automotive vehicles. However, providing hydrogen gas as a separate fuel at automotive service stations is impractical because hydrogen distribution infrastructure for automotive use is non-existent. In addition, transport and storage of large quantities of hydrogen represent a very significant safety hazard.

To overcome this lack of hydrogen gas availability at automotive service stations, proposals have been made to produce hydrogen gas directly on board an automotive vehicle by electrolysis of water. It is well known in the art that liquid water can be dissociated into hydrogen and oxygen gases in an electrolytic cell. Electrolytic cells suitable for generation of hydrogen on-board automotive vehicles have been disclosed in prior art, for example by Andrews et al. in U.S. Pat. No. 6,698,389 (Andrews 2) and Zagaja et al. in U.S. Pat. No's. 6,857,397 and 6,659,049. To sustain appropriate hydrogen production rates requires a reliable source of liquid water. It has been earlier recognized that ICE exhaust gases contain a significant amount of water vapor which originates primarily from combustion of hydrocarbon fuel. In particular, under typical operating conditions ICE exhaust gas stream contains approximately 12% $CO_2$, 16% $H_2O$ and 72% of other (mostly nitrogen and inert) gases by volume. Since the ICE exhaust gases are very hot (typically over 300 degrees Centigrade), all of the water contained therein is in the form of vapor. In particular, at sea level (760 Torr total ambient pressure) the partial pressure of water vapor in the ICE gases is about 118 Torr, which translates to a dew point of 55 degrees Centigrade (131 degrees Fahrenheit). At higher elevations the partial pressure of water in ICE exhaust is significantly reduced. For example, in Denver, Colo. with elevation approximately 6,500 feet (1,983 meters), the total atmospheric pressure is only about 600 Torr and the partial pressure of water in ICE exhaust is about 96 Torr, which translates to a dew point of 51 degrees Centigrade (124 degrees Fahrenheit).

To illustrate the potential of ICE exhaust gases as a source of water one may consider an automotive vehicle with an ICE moving at 100 kilometers per hour (65 miles per hour) and consuming 1.5 grams of fuel per second. Combustion of fuel at this rate would generate about 2.1 grams of water vapor per second which translates to about 7.7 kilograms of water per hour. Benz et al. in U.S. Pat. No. 5,658,449 estimates that to support hydrogen production, water should be supplied to an electrolytic cell at a rate of about 35 grams per hour. It is evident that hydrogen production needs on-board the automotive vehicle could be comfortably met by converting only a small fraction (about 0.5%) of the total available water content in ICE exhaust into liquid water.

It is well known that water condensate forms when gases containing water vapor are cooled to below the dew point. Since ICE exhaust gases passing through an automotive exhaust system are rather hot, they must undergo a very significant cooling before precipitation of liquid water is induced. Andrews et al. in U.S. Pat. No. 6,804,949 (Andrews 3) discloses a method for production of water from ICE exhaust gases wherein at least a portion of the exhaust gases at near ambient pressure is cooled to below its dew point to form liquid water condensate. Andrews estimates that at typical atmospheric conditions the dew point of ICE exhaust gases (at ambient pressure) is about 55 degrees Centigrade (131 degrees Fahrenheit).

Said Andrews 3 discloses three methods for cooling ICE exhaust gases to below dew point: 1) cooling by ambient air, 2) cooling by ICE coolant, and 3) cooling by a heat pump. The first method wherein ICE exhaust gases are cooled to below a dew point by rejecting heat to ambient air is rather ineffective on hot days when the ambient air temperature approaches the dew point of ICE exhaust gas. For example, an ambient air temperature around 40 degrees Centigrade (104 degrees Fahrenheit) is only 15 degrees Centigrade below the expected 55 degrees Centigrade dew point of ICE exhaust. It should be noted that mid-day temperatures around 40 degrees Centigrade and higher are common in many parts of the United States during the Summer. Temperature difference of only 15 degrees Centigrade between ambient conditions and the dew point does not allow for efficient heat transfer and severely limits extraction of water from ICE exhaust gases. In addition, temperatures of automotive components in proximity of the ICE (namely in the ICE compartment) and the exhaust system usually greatly exceed the temperature of ambient air. This also applies to vehicle components exposed to the sun. Consequently, cooling of ICE exhaust gases at near ambient pressure to below a dew point using ambient air is only viable in cool weather conditions.

The second method disclosed by Andrews 3 wherein ICE exhaust gases are cooled by ICE coolant is only effective when the coolant is relatively cold as it may be expected during startup especially in cool ambient conditions. However, within a few minutes of startup, the ICE warms up to its operating temperature, which results in typical coolant temperatures around 100 degrees Centigrade (212 degrees Fahrenheit). Since ICE coolant at its normal operating temperature is not capable to cool ICE exhaust gases to below the dew point of 55 degrees Centigrade, this method is effective only during the brief period of ICE startup.

The third method disclosed by Andrews 3 wherein ICE exhaust gases are cooled by a vapor-compression heat pump such as an automotive air-conditioning system can be very effective. Since an evaporator in automotive air-condition system often can reach temperatures as low as 5 degrees Centigrade a large fraction of the water content in ICE exhaust gases can be condensed into liquid. However, this approach requires that an air-conditioning system is actually installed in the vehicle, and that it is operated even at times when not necessary for the comfort of vehicle occupants. The latter would undoubtedly result in a very significant wear on the air-condition system and reduced fuel efficiency of the automotive vehicle. Said Andrews 2 and said Zagaja et al. each disclose a method of cooling ICE exhaust gases using a thermo-electric cooler (TEC). While this approach can be effective, TEC is expensive, requires significant amount of electric power to operate, and generates significant amount of heat that must be rejected.

One of the challenges of generating and storing liquid water onboard an automotive vehicle is the potential for freezing in cold weather conditions. Andrews 3 discloses a water source wherein resistance against freezing is obtained by keeping the water source components in a thermal contact with warm components of the ICE. However, Andrews 3 does not disclose which components are thermally connected, or specific means by which such a thermal contact is accomplished, or how temperature control is maintained.

It is well known in the art that when a mixture of gases containing water vapor is compressed above ambient pressure its dew point increases, which means that liquid water condensation can occur at a higher temperature. This phenomenon is actually a hindrance in many compressed air installations. Therefore, various means have been devised to dehumidify compressed air in industrial application. See, for example, Ewing et al. in U.S. Pat. No. 2,077,315 or Alderson et al. in U.S. Pat. No. 3,226,948. Devices and methods for direct extraction of water from air using condensation at above ambient pressure have been disclosed by Spletzer et al. in U.S. Pat. Nos. 6,230,503, 6,360,549, and 6,511,525. However, Spletzer does not show how this approach could be used to extract liquid water from hot ICE exhaust gases on an automotive vehicle under all-weather conditions. In particular, Spletzer does not teach cooling of hot ICE exhaust gages prior to compression, prevention of particulates entering the compressor, operating the compressor from ICE shaft, condensing and collecting liquid water, preventing collected water from freezing, and delivering liquid water to end use stations within an automotive vehicle.

In summary, the prior art does not teach an ICE system with a water source that is operational at all atmospheric conditions, that is robust to freezing conditions, and that is simple and inexpensive to operate. Consequently, there is a great need for new devices and methods for extracting liquid water from ICE exhaust gases. Suitable water source should use very little motive power as not to significantly reduce vehicle mileage, should be capable of operating without human intervention in hot and cold climates and under any weather conditions including freezing conditions, should endure storage under freezing conditions without damage, should be robust to vibrations, and should be inexpensive to manufacture and integrate into automotive vehicles.

SUMMARY OF THE INVENTION

The present invention provides an ICE/water source system wherein the water vapor from ICE exhaust gases is condensed into liquid water. A portion of ICE exhaust gases is separated from ICE exhaust gas stream and compressed to increase the dew point. Liquid water generated by the water source can be provided to electrolytical cell for generation of hydrogen gas. Alternate uses of liquid water generated by the water source include replenishment of water in windshield washing fluid reservoir and replenishment of water in ICE coolant system.

One of the central concepts of the ICE/water source system according to the present invention is that a dew point of gases containing water vapor can be increased by increasing the total pressure of the gases. In general, compression of gases increases the partial pressure is the water vapor contained therein. As a result, condensation into liquid water can be obtained in an air-cooled condenser at a broad range of ambient temperatures including extremely hot summer temperatures. Another central concept of the ICE/water source system according to the present invention is that temperature control of the water source can be maintained by thermal communication of water source components with ICE coolant flow channel having controlled coolant flow rate.

In a first embodiment of the present invention a portion of the ICE exhaust gas is drawn from ICE exhaust duct and cooled in a heat exchanger followed by a compression to above ambient atmospheric pressure in a compressor, which is followed by cooling to below a dew point in a condenser. The compressor can be directly driven by the ICE, an air motor, an electromagnet, or an electric motor. Compression significantly increases a dew point of the ICE exhaust gases. This makes it less challenging to cool the compressed exhaust gases to below the point and induce condensation into liquid water. Each the heat exchanger and the condenser are preferably cooled by ambient air. Since the subject invention can easily produce compressed exhaust gases having a dew point well in excess of 60 degrees Centigrade, condensation at ambient temperature can be achieved even on hot summer days. This results in a very simple and reliable ICE/water source system. In its simplest implementation, the heat exchanger and the condenser each are tubular members that may include internal and/or external fins to improve heat transfer. Condensed water is collected in a reservoir. Preferably, the condenser is constructed and mounted in such a way so that liquid water can be drained therefrom into the reservoir by gravity. Exhaust gases with reduced water vapor content are separated from liquid water and vented from the reservoir. Pressure in the condenser and the reservoir is maintained by a back-pressure device, which can be a back-pressure valve, a pressure regulating valve, a metering orifice, flow restriction device, or other suitable means. Gases vented from the reservoir are returned into the ICE exhaust duct, transported into an intake manifold of the ICE, or released into the ambient atmosphere. Because the water collection reservoir is at above ambient pressure, water delivery to other parts of the ICE system such as electrolytic cell for hydrogen production, ICE coolant reservoir, or windshield washing fluid reservoir.

A second embodiment of the present invention is particularly suitable for turbocharged ICE. In a turbocharged ICE the exhaust pressure upstream the turbocharger is significantly higher than ambient atmospheric pressure and, therefore, its dew point too is considerably higher. According to a second embodiment of the present invention, a portion of ICE exhaust gases is drawn from ICE exhaust manifold located upstream of the turbocharger and cooled to below its dew point in a condenser and condensed liquid water is collected. In general, the second embodiment of the present invention is similar to the first, except that the heat exchanger and the compressor are omitted.

A variant of the water source assembly of the present invention is particularly suitable for operation in freezing conditions. At least one of the heat exchanger, compressor, condenser, or the reservoir are in thermal communication with a conduit carrying a flow of warn ICE coolant. Temperature of the conduit is regulated by a thermostatic valve which controls the coolant flow so that the heat exchanger, compressor, condenser, or the reservoir are maintained at above freezing temperature (0 degrees Centigrade).

Accordingly, it is an object of the present invention to provide a ICE/water source system which can reliably generate liquid water onboard an automotive vehicle. The ICE/water source system of the present invention is simple, lightweight, and inexpensive to manufacture and, therefore, suitable for large volume production of automotive vehicles.

It is another object of object of the present invention to provide a ICE/water source system that is operational at all atmospheric conditions, that is robust to freezing conditions, and can operate automatically without human intervention.

It is another object of object of the present invention to provide a ICE/water source system that can supply liquid water to an electrolytic cell for production of gaseous hydrogen that can be injected into ICE intake to improve operation during ICE startup.

It is another object of object of the present invention to provide a ICE/water source system that can supply liquid water to an electrolytic cell for production of gaseous hydrogen that can be injected into ICE exhaust to reduce pollutants during ICE startup.

It is another object of object of the present invention to provide a ICE/water source system that can supply liquid water to ICE coolant system.

It is another object of object of the present invention to provide a ICE/water source system that can supply liquid water to vehicle windshield washing system.

BRIEF DESCRIPTION OF THE DRAWINGS

FIG. 3 is a schematic view of the ICE/water source system in accordance with a second embodiment of the subject invention.

DETAILED DESCRIPTION OF THE PREFERRED EMBODIMENTS

Selected embodiments of the present invention will now be explained with reference to drawings. It will be apparent to those skilled in the art from this disclosure that the following descriptions of the embodiments of the present invention are merely exemplary in nature and are in no way intended to limit the invention, its application, or uses.

Figure 1:
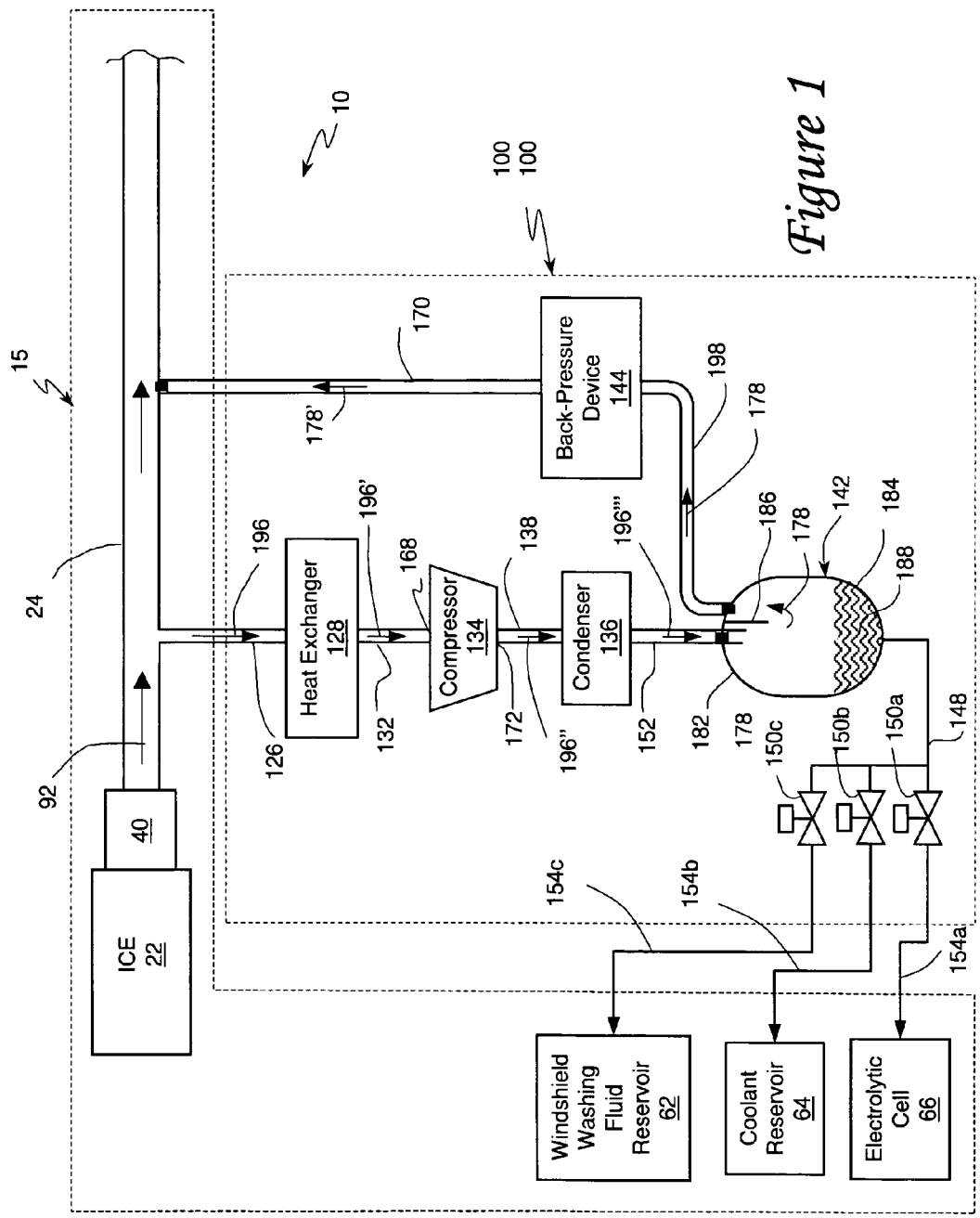
FIG. 1 is a schematic view of the ICE/water source system in accordance with a first embodiment of the subject invention.

Referring to FIG. 1 there is shown an internal combustion engine (ICE)/water source system 10 in accordance with a first embodiment of the subject invention, which includes an ICE assembly 15 and a water source assembly 100. The ICE assembly 15 includes an ICE 22, exhaust manifold 40, and exhaust duct 24. ICE 22 is adapted to combusting hydrocarbon fuel. ICE 22 can be a reciprocating or a rotary type (Wankel) engine having either a compression ignition or a spark ignition. An alternative ICE can be of the homogeneous charge compression ignition (HCCI) type. The ICE assembly 15 can also include an electrolytic cell 66 for generation of hydrogen by electrolysis of water. Furthermore, the ICE assembly 15 can include an ICE coolant system with a coolant reservoir 64 and a windshield washing system with a windshield washing fluid reservoir 62. Exhaust duct 24 is generally a tubular member adapted to transporting exhaust gas stream 92 from ICE 22. The water source assembly 100 includes a heat exchanger 128, compressor 134, condenser 136, reservoir 142, back-pressure device 144, delivery valves 150a, 150b, and 150c, and interconnecting lines 126, 132, 138, 148, 152, 154a, 154b, 154c, 170, and 198.

The compressor 134 includes a suction port 168 and an outlet port 172. The compressor 134 can be of any suitable type including a piston compressor, diaphragm compressor, vane compressor, scroll compressor, roots blower, and turbo-compressor. The compressor 134 can be driven by an electric motor, ICE main shaft, air motor, or a turbine. A diaphragm compressor can be also driven by an electromagnet. Preferably the compressor 134 is driven from the main shaft of ICE 22 by means of a belt and on/off clutch (not shown). The clutch can be engaged or disengaged to operate the compressor 134 in accordance with demand for liquid water. Suction port 168 of compressor 134 is fluidly connected to exhaust duct 124 by means of line 126, heat exchanger 128 and line 132. In particular, compressor 134 is adapted for drawing a portion of exhaust gas stream 192 into line 126 thereby forming a process stream 196.

The heat exchanger 128 is adapted to cooling the process stream 196 and thereby producing a process stream 196' at a reduced temperature. This allows compressor 134 to operate at a temperature significantly lower than the temperature of exhaust gas stream 192. The heat exchanger 128 preferably transfers heat into ambient air and it can assume a variety of suitable forms. Preferably, heat exchanger 128 is a tube which can be either straight, coiled, or having one or more bends with the exterior of the tube exposed to ambient air. The exterior of the tube may further include fins or other suitable surface extensions to enhance heat transfer to ambient air. When the subject invention is used in an automotive vehicle, heat exchanger 128 is preferably located in such a portion of the vehicle where it is exposed to a stream of ambient air induced by the vehicle motion. Alternatively, heat exchanger 128 can be cooled by ICE coolant. Preferred materials for the heat exchanger 128 are copper, copper alloys, aluminum, aluminum alloys, zinc, steel, and corrosion resistant steel.

The outlet port 172 of compressor 134 is fluidly connected to reservoir 142 by means of line 138, condenser 136, and line 152. The condenser 136 is adapted for cooling the compressed gas stream 196" to below the dew point. The condenser 136 preferably rejects heat to ambient air and it can assume a variety of suitable forms. Preferably, condenser 136 is a tube which can be either straight, coiled, or having one or more bends with the exterior of the tube exposed to ambient air. The exterior of the tube may further include fins or other surface extending features to enhance heat transfer to ambient air. Configuration of the condenser 136 is preferably such that condensed liquid water formed therein is drained by gravity into the reservoir 142. Preferably, the condenser 136 is located in such a portion of the automotive vehicle where it is exposed to a stream of ambient air induced by the vehicle motion. Preferred materials for the condenser 36 are copper, copper alloys, aluminum, aluminum alloys, zinc, steel, and corrosion resistant steel.

The reservoir 142 is a pressure vessel comprising an upper portion 182 and a lower portion 184. Line 152 fluidly connects condenser 136 and reservoir 142. Preferably, line 152 is connected to the upper portion 182 and preferably it protrudes into the interior of the reservoir 142. The upper portion 182 of reservoir 142 is fluidly connected to a back-pressure device 144. The back-pressure device 144 is an apparatus which provides impedance to a fluid flowing therethrough and, for given flow conditions, maintains the pressure in the flow upstream within predetermined range. Preferably, the back-pressure device 144 is configured to close (shutting off the flow therethough) when the pressure inside reservoir 142 is lower than a predetermined value and to open when the pressure upstream is higher than a predetermined value. Preferred predetermined pressure value is selected to be in the range from 1.5 to 3.0 bar (1,125 and 2,250 Torr) and it should be at least 20% higher than the absolute pressure value of exhaust gas stream 92. The back-pressure device 144 can assume a variety of suitable forms such as a pressure relief valve, certain types of check valves, a metering orifice, or a metering valve. When a metering orifice is used it can be employed in a conjunction with a valve which is open only when the compressor 134 is operating. This arrangement permits maintaining a positive pressure in reservoir 142 when the compressor 134 is not in operation.

The reservoir 142 may also include a baffle 186 or other suitable means to assist separation of gas and liquid mixture in the process stream 196''' entering the reservoir through line 152. Suitable gas-liquid separation devices include impingement separators and centrifugal separators (e.g., cyclones). See, for example, Chemical Engineer's Handbook, 5$^{th}$ edition, edited by Robert H. Perry and Cecil H. Chilton, published by Mc-Graw-Hill Book company, New York, N.Y., 1973, chapter 18, section titled "Phase Separation." The lower portion 184 of reservoir 142 is adapted for collection and storage of condensed liquid water 188. The lower portion 184 is fluidly connected to a transfer line 148 leading to delivery valves 150a, 150b, and 150c. Reservoir 142 is preferably made of metal such as copper, copper alloys, aluminum, aluminum alloys, zinc, or steel, or a high-temperature plastic material. Reservoir 142 can be further equipped with a safety pressure relief valve and one or more liquid level sensors. The back-pressure device 144 is set to open at a predetermined pressure. The back-pressure device 144 is preferably fluidly connected the exhaust duct 24 by return line 170. Alternatively, the back-pressure device 144 can be fluidly connected to the intake manifold of the ICE. In this arrangement the water source 100 also provides exhaust gas recirculation (EGR) function. As another alternative, the back-pressure device 144 can be open to ambient atmosphere. Line 148 may also include a cation/anion exchange bed or other suitable means to remove contaminants from the collected water. Valves 150a, 150b, and 150c are preferably solenoid operated and preferably configured in a normally closed position. Opening of any of the valves 150a, 150b, and 150c allows transfer of liquid water 188 from the reservoir 142 to the hydrogen-producing electrolytic cell 66, ICE coolant reservoir 64, or windshield washing fluid reservoir 62.

During normal operation of ICE/water source system 10, ICE 22 is supplied with hydrocarbon fuel which is combusted therein to yield exhaust gas stream 92. Exhaust gas stream 92 is transported from the ICE 22 through exhaust duct 24. Once the ICE 22 warms up to its normal operating temperature, the exhaust gas stream 92 is typically very hot with a temperature possibly exceeding 300 degrees Centigrade. When production of liquid water is desired, compressor 134 is caused to operate. For example, if the compressor 134 is driven by an electric motor, then the compressor is caused to operate by energizing the electric motor. If the compressor 134 is driven from the main shaft of ICE 22 by means of an on/off clutch, then the compressor is caused to operate by energizing the clutch. When operating, the compressor 134 draws a portion of exhaust gases 92 from exhaust duct 24 into line 126 thereby forming a process stream 196. Process stream 196 is then drawn through line 126 into heat exchanger 128 where its temperature is reduced preferably to less than 100 degrees Centigrade, thereby producing a cooler process stream 196'. Heat exchanger 128 preferably rejects heat to ambient air. Process stream 196' exists the heat exchanger 128 and is drawn through line 132 and through suction port 168 into the compressor 134 where it is compressed to a higher pressure, thereby forming a process stream 196". Process stream 196" exists the compressor 134 through output port 172 into line 138 and therethrough into condenser 136 where it is cooled to below its dew point, thereby producing a process stream 196'''. As result, a significant portion the water vapor content in the process stream 196" is condensed on the interior walls of the condenser 136 into liquid water. Condenser 136 preferably rejects heat to ambient air. Preferably, the condenser 136 is designed and mounted so that liquid condensate is drained by gravity into line 152 and therethrough into reservoir 142. Alternatively, gases in process stream 196''' force the condensed liquid water through condenser 136 into line 152 and therethrough into reservoir 142. When a process stream 196''' comprising a mixture of gases and liquid water enters the reservoir 142, the liquid is separated from the gas and collected in the lower portion 182. Gas stream 178 separated from the liquid water is vented from reservoir 142 by backpressure device 144. Preferably, gas stream 178' downstream of the backpressure device 144 is transported to exhaust duct 24 by return line 170. Alternatively, the gas stream 178' is fed to ICE intake manifold. As another alternative, the gas stream 178' is released to ambient atmosphere. The predetermined pressure value at which the backpressure device 144 makes a transition from closed position to open position generally defines the pressure inside the line 132, condenser 136, line 152, and reservoir 142. Reservoir 142 can be also equipped with one or more liquid level sensors that provide signal to a control unit (not shown). The control unit can cause the compressor 134 to operate as appropriate to maintain the liquid level of liquid water 188 in reservoir 142 within predetermined limits.

Since the reservoir 142 is maintained at above atmospheric pressure, liquid water 188 can be delivered therefrom to electrolytic cell 66, ICE coolant reservoir 64, and windshield washing fluid reservoir 162 without the need for a pump. When any of the valves 150a, 150b, and 150c opens, liquid water 188 flows from reservoir 142 through line 148 and through the open valve 150a, 150b, or 150c and appropriate line 154a, 154b or 154c to electrolytic cell 66, ICE coolant reservoir 64, or windshield washing fluid reservoir 52 as appropriate.

EXAMPLE 1

ICE/water source system 10 operated at a sea level with ambient atmospheric pressure of 760 Torr and at an ambient temperature of 40 degrees Centigrade (104 degrees Fahrenheit). To limit ICE pumping loss ICE designers normally strive to keep the pressure drop in the exhaust duct 24 is very small. This means that the pressure inside the exhaust duct 24 is only slightly higher than the ambient atmospheric pressure. Therefore, the partial pressure of the water vapor in the ICE exhaust gases 92 is about 118 Torr and the dew point is 55 degrees Centigrade. Process stream 196 is drawn from exhaust gas stream 92 and cooled in heat exchanger 128 to a temperature of 60 degrees Centigrade. Because this temperature is above the dew point of the exhaust gas stream 92, no condensation is expected to occur before process stream 196' reaches the compressor 134. One liter of the gases in process stream 196' contains approximately 0.1 grams of water vapor. Compressor 134 is operated to draw the process stream 196' at the temperature 60 degrees and a volumetric rate of 162 cubic centimeters per second (about 0.34 cubic foot per minute) and to compress it to 1,520 Torr, which is two times the ambient atmospheric pressure. At this total pressure the partial pressure of the water vapor in the process stream 196" is 236 Torr and the dew point is about 70 degrees Centigrade. Power required to operate the compressor is about 30 watts. Compressed process stream 196" is delivered to condenser 136 where it is cooled to 50 degrees Centigrade, which is well below the dew point of 70 degrees Centigrade. As a result, water vapor in process stream 196" will condense into liquid water until the partial pressure of the residual water vapor drops to 93 Torr, which corresponds to a dew point of 50 degrees Centigrade. The fraction of the water vapor contained in process stream 196" that is liquified in this process is (236−93)/236=0.61 which translates to a production rate of 35 grams per hour. This production rate meets the water delivery requirements set forth by the aforementioned Benz. This example also shows that the size of the compressor and its power requirements are very small.

Figure 2A:
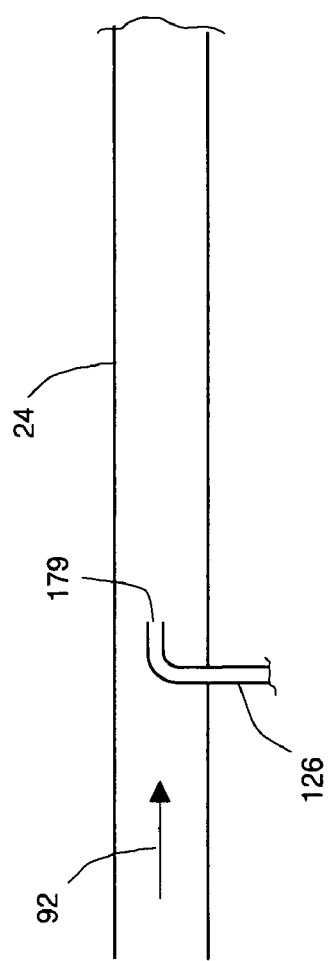
FIG. 2a is a schematic view of a preferred connection of the water source assembly to ICE exhaust duct.
Figure 2B:
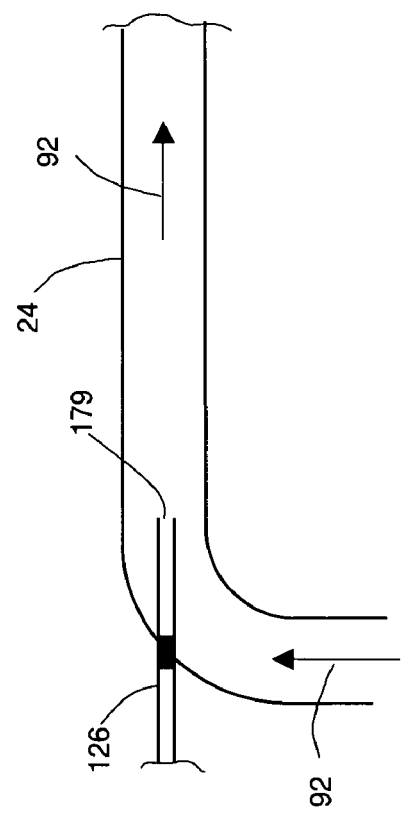
FIG. 2b is a schematic view of an alternative preferred connection of the water source assembly to ICE exhaust duct.

There are numerous variations of the ICE/water source system in accordance with a first embodiment of the subject invention. For example, a check valve is preferably inserted into line 138 to prevent a backflow from reservoir 142 into condenser 136 when the compressor 134 is not in operation. To avoid particulates and soot normally found in exhaust gas stream 192 from entering the water source 100, a particulate filter can be inserted into line 126. In addition, the connection of water source 100 to exhaust duct 24 can be configured to reduce the possibility of such particulates and soot entering line 126. The preferred configurations of the connections of water source line 126 to exhaust duct 24 are shown in FIG. 2a and FIG. 2b. FIG. 2a shows the line 126' protruding into the interior of exhaust duct 24' where it is bent so that its inlet opening 179 faces downstream with respect to the flow of exhaust gas stream 92. FIG. 2b shows the line 126" inserted into a bend in exhaust duct 24" with its opening facing opening 179 faces downstream with respect to the flow of exhaust gas stream 92.

Referring now to FIG. 3 there is shown an ICE/water source system 11 in accordance with a second embodiment of the subject invention suitable for use with turbocharged ICE, which includes an ICE assembly 17 and a water source assembly 200. The ICE assembly 21 includes an ICE 22, exhaust manifold 40, turbocharger 56, and exhaust duct 24. The turbocharger 56 is preferably an ICE supercharger of conventional type powered by a turbine operated by ICE exhaust gases. The exhaust manifold 40 fluidly connects the ICE 22 to an inlet (high pressure) port of the turbocharger turbine and the exhaust duct 24 fluidly connects to an outlet (low pressure) port of the turbocharger turbine. The water source assembly 200 is similar to water source assembly 100 (FIG. 1) except that the heat exchanger 128, compressor 134, and lines 132 and 138 are omitted. In particular, water source assembly 200 includes a condenser 236, reservoir 242, back-pressure device 244, delivery valves 250a, 250b, and 250c, and interconnecting lines 226, 248, 252, 254a, 254b, 254c, 270 and 298. Line 226 fluidly connects condenser 236 to exhaust manifold 40.

During normal operation of ICE/water source system 11, ICE 22 is supplied with hydrocarbon fuel which is combusted therein to yield exhaust gas stream 92". Exhaust gas stream 92" is transported from the ICE 22 through exhaust manifold 40 to turbocharger 56. Flow from the turbocharger 56 is transported as an exhaust gas stream 92' through exhaust duct 24. Because of the impedance provided by the turbocharger 56, the pressure in the exhaust manifold 40 is much higher than the pressure in exhaust duct 24. When production of liquid water is desired, valve 260 is caused to open. The pressure of exhaust gas stream 92" in exhaust manifold 40 forces a portion of exhaust gases 92" into line 226 thereby forming a process stream 296". Process stream 296" is then forced through line 226 and valve 260 into condenser 236 where it is cooled to below its dew point, thereby producing a process stream 296'". As result, a significant portion the water vapor content in the process stream 296'" is condensed into liquid water and deposited on the interior walls of the condenser 236. Condenser 236 preferably rejects heat to ambient air. Preferably, the condenser 236 is designed and mounted so that liquid condensate is drained by gravity into line 252 and therethrough into reservoir 242. Alternatively, the flow of gases through the condenser forces the condensed liquid water into line 252 and therethrough into reservoir 242. When a mixture of gases and liquid water from line 252 enters the reservoir 242, the liquid is separated from the gas and collected in the lower portion 282. Gas 278 separated from the liquid water is transported by line 298 and vented by means of back-pressure device 244. Pressure setting at which the backpressure device 244 makes a transition from closed to open generally defines the pressure inside the line 232, condenser 236, line 252, and reservoir 242. Gas stream 278 removed from reservoir 242 through the back-pressure device 244 forms a stream 278' which is preferably transported to the exhaust duct 24 by means of a return line 270. Alternatively, gas stream 278 can be either transported by return line 270 into exhaust duct 24, or transported into the exhaust manifold of ICE 22, or vented to ambient atmosphere. Reservoir 242 can be also equipped with one or more liquid level sensors that provide signal to a control unit (not shown). The control unit can cause the valve 260 to open as appropriate to maintain the liquid level of liquid water 288 in reservoir 242 within predetermined limits.

Figure 4:
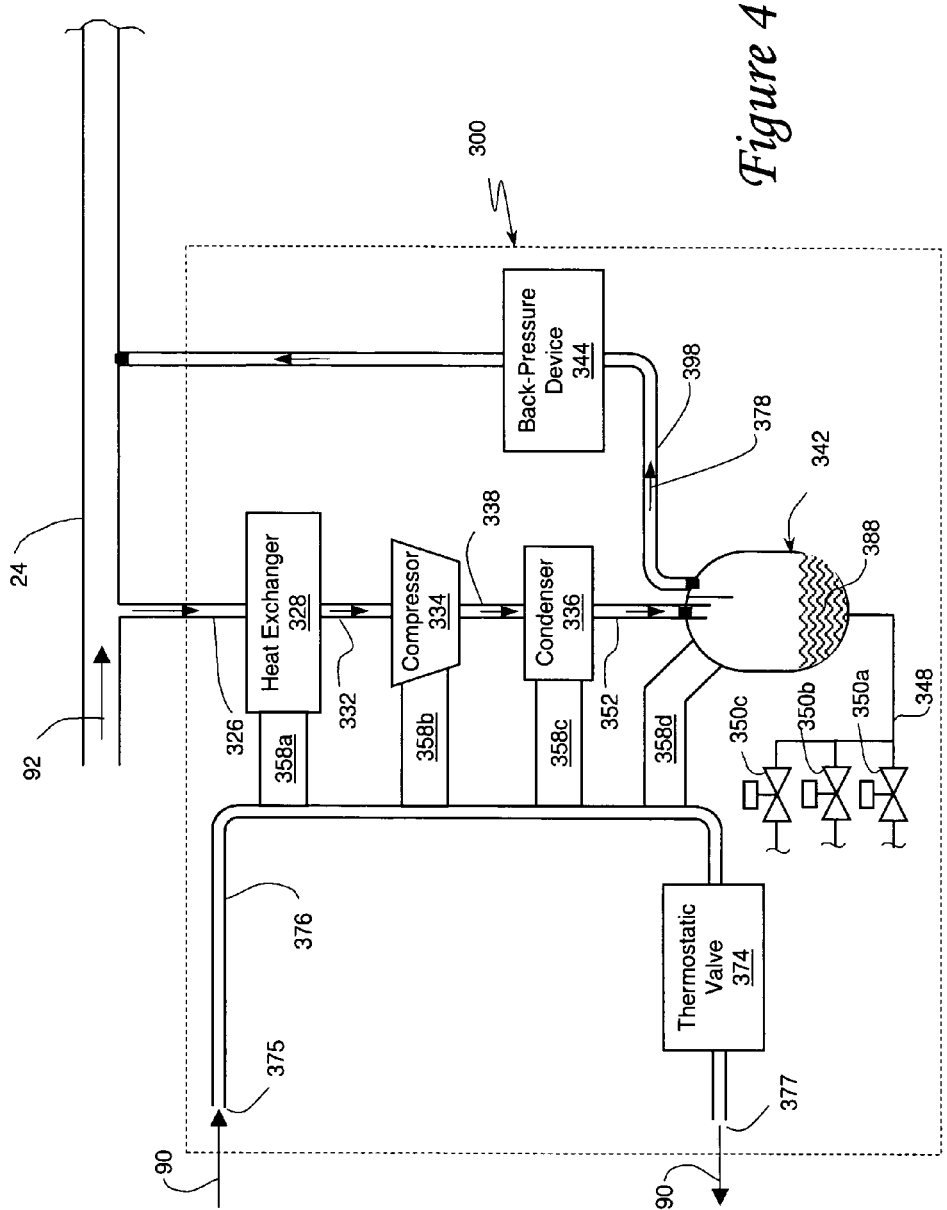
FIG. 4 is a schematic view of an alternative water source assembly with improved performance under freezing ambient conditions.

Referring now to FIG. 4 there is shown a water source assembly 300 having improved resistance to freezing conditions. The water source assembly 300 is essentially the same as water source assembly 100, but that it also includes a conduit 376, thermostatic valve 374 and thermally conducting members 358a, 358b, 358c, and 358d. Conduit 376 is a generally tubular member adapted to flowing ICE coolant 90. The conduit inlet 375 is fluidly connected to ICE coolant pump outlet port (not shown) and conduit outlet 377 is fluidly connected to ICE coolant pump suction port (not shown). Preferably, conduit 376 is made of a thermally conductive material such as copper, copper alloys, aluminum, aluminum allays, zinc, steel, and metal. The thermally conductive members 358a members 358a, 358b, 358c, and 358d are each attached to and in a good thermal contact with conduit 376. In addition, each conductive member 358a, 358b, 358c, and 358d is respectively attached to and in a good thermal contact with the heat exchanger 328, compressor 334, condenser 336, and reservoir 342. Thermostatic valve 374 is preferably installed in the conduit 376 near the outlet 377. Thermostatic valve 374 is arranged to be in an open position and allowing a flow of coolant 90 therethrough when the temperature of coolant 90 at the valve location is lower than a first predetermined temperature. Preferably, the first predetermined temperature is selected to be between about 10 and about 20 degrees Centigrade. Thermostatic valve 374 is arranged to be in a closed position and preventing a flow of coolant 90 therethrough when the temperature of coolant 90 at the location of valve 374 is higher than a second predetermined temperature. Preferably, the second predetermined temperature is selected to be between about 30 and about 50 degrees Centigrade. Choosing these temperature ranges would result in coolant temperatures between about 10 and about 50 degrees Centigrade.

When the ICE 22 (FIG. 1) operates, flow of ICE coolant 90 through conduit 376 is subject to control by thermostatic valve 374. Under normal operating conditions the thermostatic valve 374 maintains the temperature of the conduit in the proximity of thermostatic valve 374 approximately between the first and the second predetermined temperatures. When the temperature of ambient air is below the first predetermined temperature, heat flows from the conduit 376 through conductive members 358a, 358b, 358c, and 358d respectively to heat exchanger 328, compressor 334, condenser 336 and reservoir 342. Assuming that the coolant 90 is delivered to the inlet 375 of conduit 376 at about 90 degrees Centigrade, its temperature will continue to drop as the coolant 90 flows toward thermostatic valve 374. When the temperature of ambient air is significantly above the first predetermined temperature, heat exchanger 328, compressor 334, condenser 336 and reservoir 342 are largely cooled by ambient air. In addition, some of the heat from heat exchanger 328, compressor 334, condenser 336 and reservoir 342 can be also transferred by respective conductive members 358a, 358b, 358c, and 358d to conduit 376. When the temperature of ambient air is exceeds the second predetermined temperature, the thermostatic valve 374 closes and flow of coolant through conduit 376 is inhibited. Under these conditions, heat exchanger 328, compressor 334, condenser 336 and reservoir 342 are cooled by air.

A variety of conventional components can be used for construction of the present invention. Examples of a suitable compressor 134 include a reciprocating piston compressor, diaphragm compressor, vane compressor, turbo-compressor, and scroll compressor. The compressor can be drive by an electric motor, air motor, a turbine, the ICE, or a combination thereof. In particular, said air motor and turbine can be at least in-part operated by the gas stream 178 (FIG. 1). In that case, it is possible to omit the backpressure device 144. A diaphragm compressor can be also operated by an electromagnet. The use of subject invention not limited automotive applications. For example, the subject invention can be used also in marine applications to generate fresh water.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

Moreover, terms that are expressed as "means-plus function" in the claims should include any structure that can be utilized to carry out the function of that part of the present invention. In addition, the term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the present invention as defined in the appended claims. Furthermore, the foregoing description of the embodiments according to the present invention are provided for illustration only, and not for the purpose of limiting the present invention as defined by the appended claims and their equivalents. Thus, the scope of the present invention is not limited to the disclosed embodiments.

What is claimed is:

1. An internal combustion engine (ICE)/water source system comprising:
   (a) an ICE assembly including an ICE and an exhaust duct for flowing exhaust gases from said ICE; and,
   (b) a water source assembly for providing liquid water, said water source assembly comprising:
      (i) a compressor fluidly connected to said exhaust duct, said compressor adapted for receiving exhaust gases from said exhaust duct and compressing them to a predetermined pressure value, said predetermined pressure value being substantially greater than the pressure inside said exhaust duct;
      (ii) a condenser fluidly connected to said compressor, said condenser adapted for receiving compressed gases from said compressor and cooling them to below a dew point to induce condensation of liquid water therefrom;
      (iii) a reservoir fluidly connected to said condenser and adapted for receiving and collecting liquid water therefrom;
      (iv) a backpressure device fluidly connected to said reservoir and adapted for releasing excess compressed gases; and
   wherein said ICE assembly further includes a coolant system having a flow of liquid coolant maintained by a thermostatic valve at a temperature between about 10 degrees Centigrade and about 50 degrees Centigrade; and at least one of said compressor, said condenser and said reservoir is in a good thermal communication with said flow of liquid coolant.

2. The ICE/water source system as in claim 1 wherein said condenser is adapted for rejecting heat to ambient atmospheric air.

3. The ICE/water source system as in claim 1 wherein said predetermined pressure value is at least 20% higher than the pressure value of exhaust gases inside said exhaust duct.

4. The ICE/water source system as in claim 1 wherein said ICE assembly further includes an intake manifold; and said excess gases released from said reservoir flow to a destination selected from the group consisting of said exhaust duct and said intake manifold.

5. The ICE/water source system as in claim 1 wherein said liquid water is delivered under positive pressure maintained in said reservoir to a device selected from the group consisting of an electrolytic cell for generation of hydrogen, an ICE coolant reservoir, and a windshield washing fluid reservoir.

6. The ICE/water source system as in claim 1 wherein said compressor is operated by means selected from the group consisting of an electric motor, air motor, turbine, and a shaft of said ICE.

7. The ICE/water source system as in claim 1 further comprising a heat exchanger disposed between said exhaust duct and said compressor, said heat exchanger fluidly connected to said exhaust duct, said heat exchanger fluidly connected to a suction port of said compressor, said heat exchanger adapted for cooling gases received from said exhaust duct and providing cooled gases to said suction port.

8. The ICE/water source system as in claim 7 wherein said ICE assembly further includes a coolant system having a liquid coolant; and said heat exchanger is adapted to rejecting heat to a medium selected from the group consisting of ambient atmospheric air and said liquid coolant.

9. An internal combustion engine (ICE)/water source system comprising:
   (a) an ICE assembly including an ICE, an exhaust manifold for flowing exhaust gases at manifold pressure from said ICE, and a turbocharger fluidly connected to said exhaust manifold and receiving therefrom exhaust gases at about said manifold pressure; and,
   (b) a water source assembly for providing liquid water, said water source assembly comprising:
      (i) a condenser fluidly connected to said exhaust manifold upstream of said turbocharger, said condenser adapted for receiving exhaust gases at about said manifold pressure from said exhaust manifold and cooling them to below a dew point to induce condensation of liquid water therefrom;
      (ii) a reservoir fluidly connected to said condenser and adapted for receiving and collecting liquid water therefrom; and
      (iii) a backpressure device fluidly connected to said reservoir and adapted for releasing excess gases from said reservoir.

10. The ICE/water source system as in claim 9 wherein said condenser is adapted to rejecting heat to ambient atmospheric air.

11. The ICE/water source system as in claim 9 wherein said ICE assembly further includes an intake manifold; and excess gases released from said reservoir flow to a destination selected from the group consisting of said exhaust duct and said intake manifold.

12. The ICE/water source system as in claim 9 wherein said liquid water is delivered to a device selected from the family consisting of an electrolytic cell for generation of hydrogen, an ICE coolant reservoir, and a windshield washing fluid reservoir.

13. The ICE/water source system as in claim 9 wherein said ICE assembly further includes a coolant system having a flow of liquid coolant maintained by a thermostatic valve at a temperature between about 10 degrees Centigrade and about 50 degrees Centigrade; and at least one of said condenser and said reservoir is in a good thermal communication with said flow of liquid coolant.

14. A method for producing liquid water from exhaust gases of an internal combustion engine (ICE) having a turbocharger comprising the steps of:
   a. operating an ICE to generate exhaust gas stream feeding said turbocharger;
   b. operating said turbocharger;
   c. separating a portion of said exhaust gas stream feeding said turbocharger to form a process stream;
   d. cooling said process stream to induce condensation of liquid water therein; and
   e. collecting said liquid water.

15. The method of claim 14 further comprising the step of delivering collected water to a device selected from the group consisting of an electrolytic cell for generation of hydrogen, an ICE coolant reservoir, and windshield washing fluid reservoir.

* * * * *